US008290429B2

(12) United States Patent
Imaeda

(10) Patent No.: US 8,290,429 B2
(45) Date of Patent: Oct. 16, 2012

(54) COMMUNICATION APPARATUS AND RELAYED COMMUNICATION SYSTEM AND CONTROL METHOD THEREOF

(75) Inventor: Eiji Imaeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/666,285

(22) PCT Filed: Jul. 31, 2008

(86) PCT No.: PCT/JP2008/064172
§ 371 (c)(1),
(2), (4) Date: Dec. 22, 2009

(87) PCT Pub. No.: WO2009/025181
PCT Pub. Date: Feb. 26, 2009

(65) Prior Publication Data
US 2010/0323613 A1 Dec. 23, 2010

(30) Foreign Application Priority Data
Aug. 22, 2007 (JP) ................................. 2007-216404

(51) Int. Cl.
*H04Q 7/20* (2006.01)
(52) U.S. Cl. ..... 455/7; 455/11.1; 455/426.1; 455/426.2; 455/67.11; 455/403; 370/310; 370/315; 370/328; 370/329; 370/338
(58) Field of Classification Search ............. 455/7, 11.1, 455/426.1, 426.2, 422.1, 403, 550.1, 445, 455/67.11, 500, 517, 509, 507; 370/310, 370/315, 328, 329, 338, 343, 347
See application file for complete search history.

(56) References Cited

U.S. PATENT DOCUMENTS

| 7,095,732 | B1 | 8/2006 | Watson, Jr. |
| 2004/0032847 | A1* | 2/2004 | Cain ............................. 370/338 |
| 2005/0002373 | A1 | 1/2005 | Watanabe et al. |
| 2007/0149118 | A1 | 6/2007 | Kang et al. |
| 2007/0274272 | A1* | 11/2007 | Joshi et al. .................... 370/338 |
| 2009/0252140 | A1 | 10/2009 | Imaeda |

FOREIGN PATENT DOCUMENTS
JP 9-238100 A 9/1997
(Continued)

OTHER PUBLICATIONS

"Part 11: Wireless LAN Medium Access Control (MAC) and Physical Layer (PHY) specifications: High-speed Physical Layer in the 5 GHz Band", IEEE Std 802.11a, 1999, pp. 1-83.
Japanese Office Action dated Jan. 23, 2012 issued in corresponding Japanese Patent Application No. 2007-216404.

*Primary Examiner* — Keith Ferguson
(74) *Attorney, Agent, or Firm* — Fitzpatrick, Cella, Harper & Scinto

(57) ABSTRACT

A relayed communication system including a supervising station and a plurality of communication stations, transmits data from the supervising station to the communication stations by relay transmission. Each of the plurality of communication stations determines the quality of communication with the supervising station, and notifies the determined communication quality to the supervising station. If the communication quality is equal to or greater than a predetermined value, the supervising station allocates one or more communication stations as relay stations to respective time slots in descending order of the communication quality, and transmits the allocation result to the plurality of communication stations. As a result, each communication station can perform relayed communication using the time slot that is allocated thereto.

14 Claims, 17 Drawing Sheets

FOREIGN PATENT DOCUMENTS

| | | |
|---|---|---|
| JP | 2002-78012 A | 3/2002 |
| JP | 2002-171215 A | 6/2002 |
| JP | 2004-328665 A | 11/2004 |
| WO | 2007/055544 A2 | 5/2007 |

* cited by examiner

FRAME STRUCTURE OF QUERY

FRAME STRUCTURE OF REPLY

FRAME STRUCTURE OF DETECTION INSTRUCTION COMMAND

FRAME STRUCTURE OF SLOT NOTIFICATION COMMAND

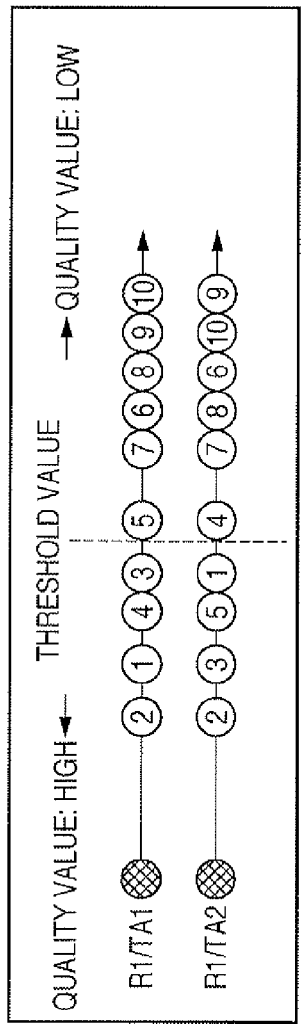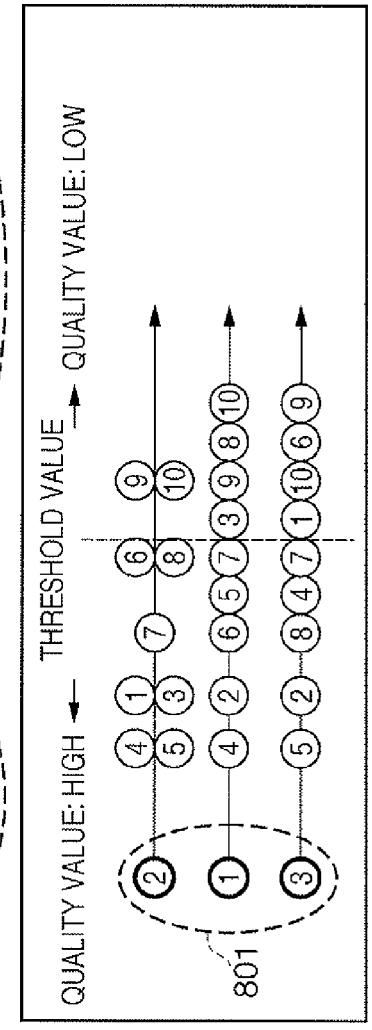
FIG. 8A
FIG. 8B

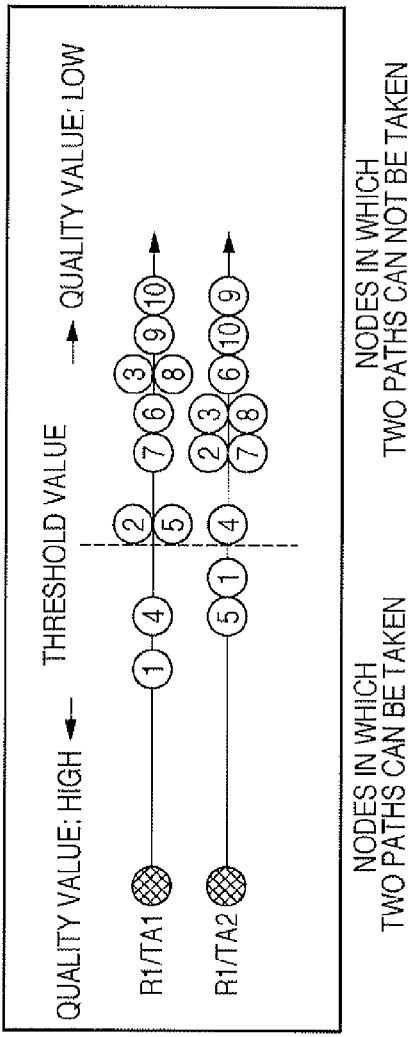
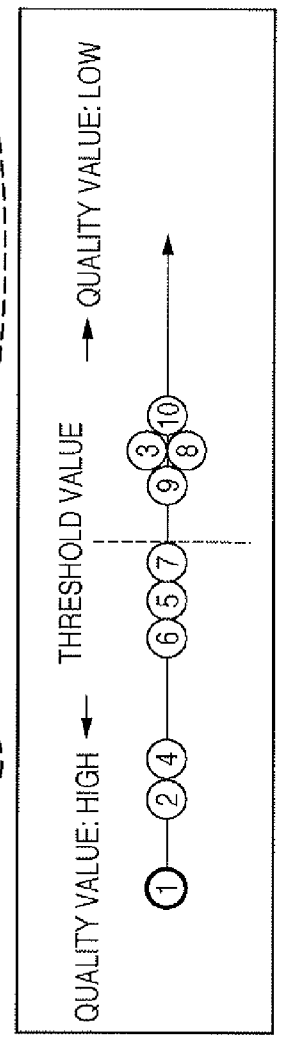
F I G. 11A
F I G. 11B

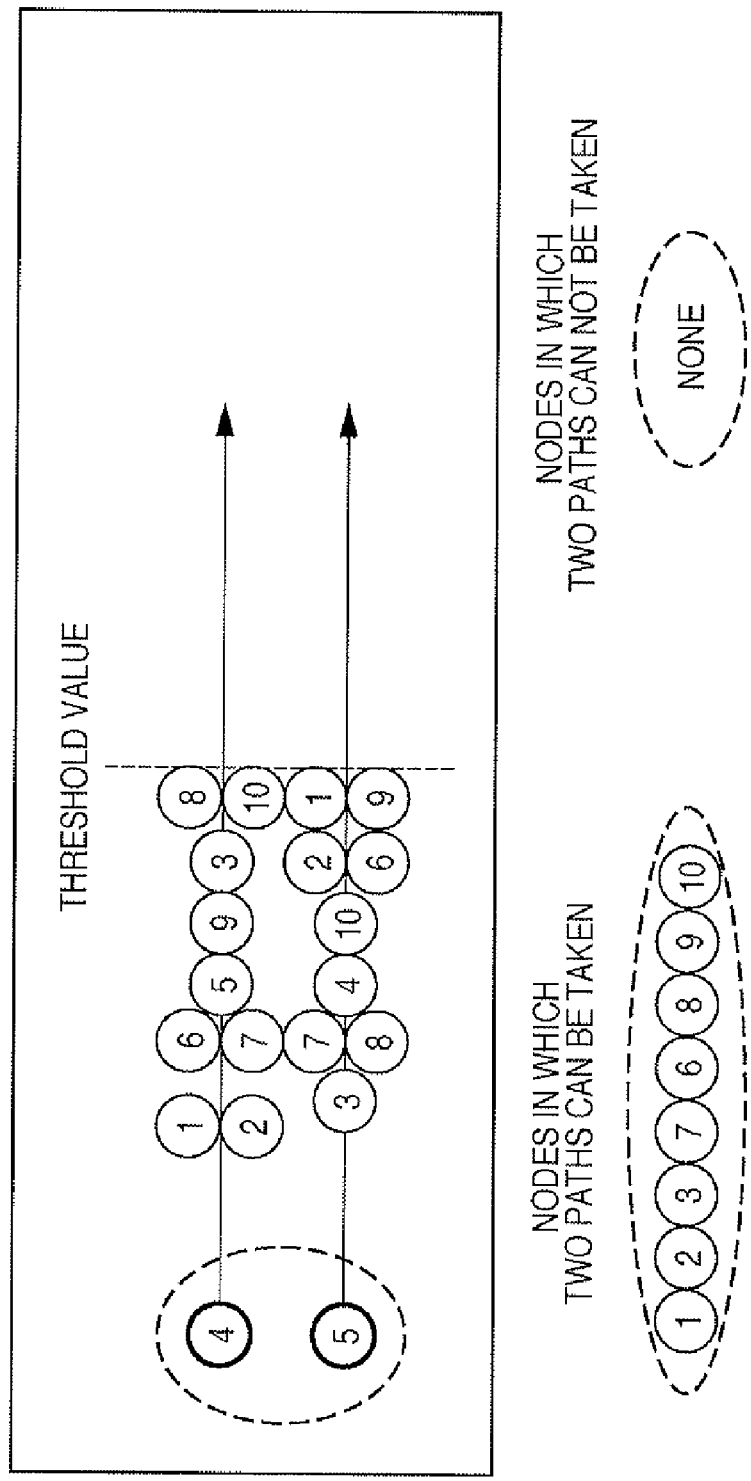

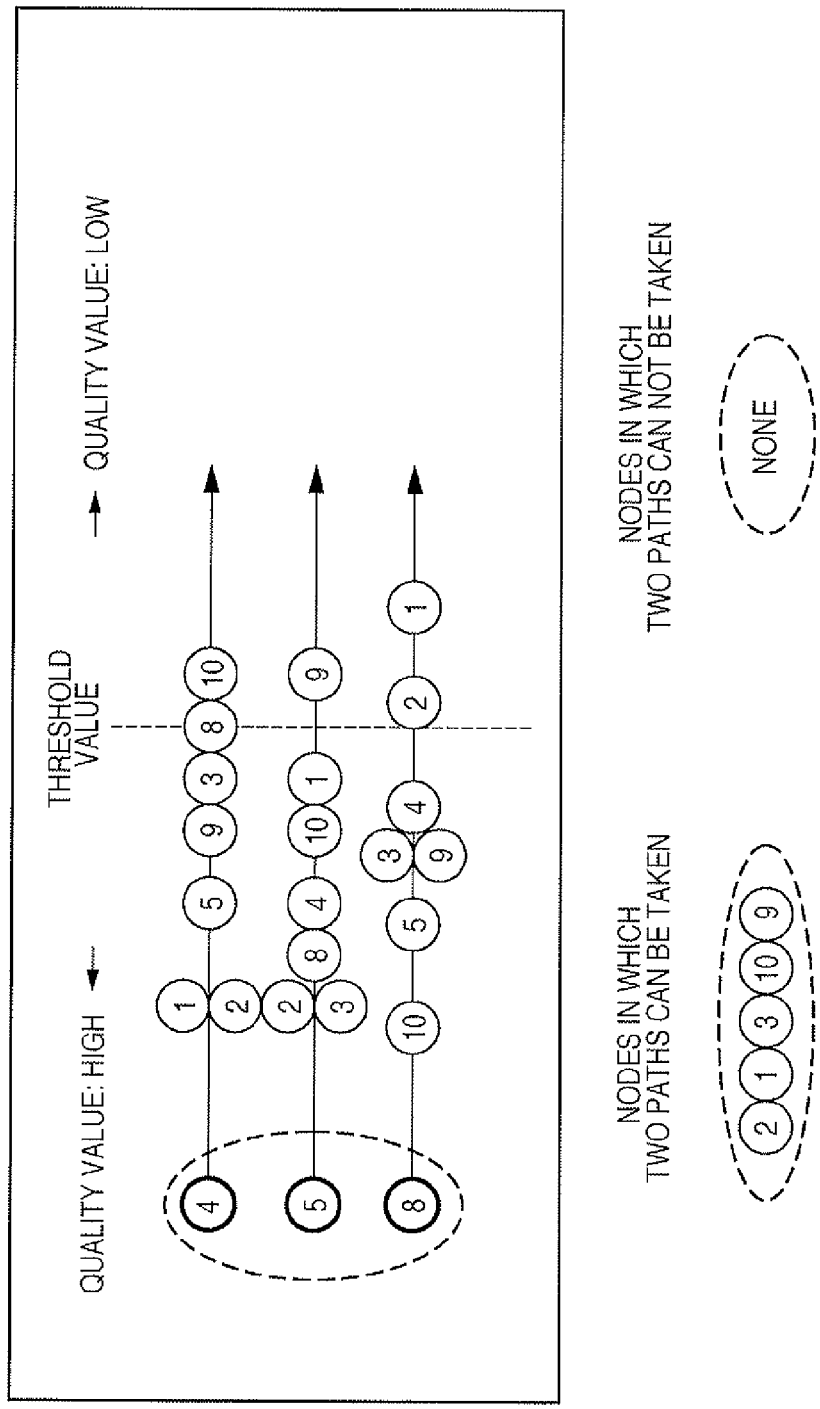

COMMUNICATION APPARATUS AND RELAYED COMMUNICATION SYSTEM AND CONTROL METHOD THEREOF

This application is a National Stage application under 35 U.S.C. §371 of International Application No. PCT/JP2008/064172, filed on Jul. 31, 2008, which claims priority to Japanese Application No. 2007-216404, filed on Aug. 22, 2007, the contents of each of the foregoing applications being incorporated by reference herein.

TECHNICAL FIELD

The present invention relates to a relayed communication system that relays data by time division (time slots) to communication stations, a control method thereof, and a communication apparatus.

BACKGROUND ART

Conventional method for allocating time slots for communication by time division wireless communication performs allocation according to random values or performs allocation in accordance with unique information of terminals (see Japanese Patent Laid-Open Publication No. 9-238100). A method is also known in which a plurality of relay terminals are made to use the same time-division slot that is previously allocated to implement relay transmission (see Japanese Patent Laid-Open Publication No. 2002-171215). In addition, a method is known in which a plurality of relay stations are allocated to the same time slot and the optimal relay station is selected according to the radio wave intensity (see Japanese Patent Laid-Open Publication No. 2004-328665).

In recent years, wireless communication is also being utilized for communication between domestic information devices. As a method that simply and effectively implements this kind of wireless communication between domestic information devices, a time division relayed communication method has been proposed in which information devices perform transmission of wireless data to each other using a time division system. This kind of domestic wireless communication principally involves wireless communication of stream data for which real-time performance is required, such as video data or audio data. Therefore, there is also an increasing necessity for time division relayed communication method to transmit data with lower delays and constant delays, without having to retransmit data due to the occurrence of errors or the like.

When performing relay transmission using a conventional time-division communication method, time slots for communication are randomly allocated for each terminal or, alternatively, time slots for communication are suitably allocated based on individual information of the communication terminals or the like. There is therefore the problem that when the communication quality with the communication terminal on the side starting relay transmission is poor and an error occurs, the data of poor quality in which the error occurred is transmitted in sequence by relay transmission and the communication quality of the overall time division relayed communication system deteriorates.

Further, once time slots are allocated, those time slots are kept without any change even if the communication situation changes. Therefore, cases arise in which, even though communication quality is favorable at first and relay transmission is possible, the communication quality between communication terminals carrying out relay transmission deteriorates due to the appearance of an obstacle or the movement of a relay terminal and consequently an error occurs. In this case also, there is the problem that poor quality data in which an error occurred is transmitted sequentially by relay transmission and the communication quality of the overall time division relayed communication system deteriorates.

In conventional packet communication, as one method to solve this problem, the capacity of a reception buffer is enlarged so that the data for a previously fixed time period is stored and delayed, and resending of the data is executed within the delay time to execute recovery. As another method, the error tolerance of wireless communication is improved by lowering the rate of data that is communicated so that an error does not occur. However, it has been difficult to implement communication with low delays and constant delays in stream data communication because the data rate is fixed.

DISCLOSURE OF INVENTION

An object of the present invention is to eliminate the above-mentioned conventional problems.

According to one aspect of the present invention, a relayed communication system that enables good quality communication and a control method thereof can be provided.

According to a further aspect of the present invention, there is provided a relayed communication system in which the optimal time slot is reallocated in an adaptive manner when a communication situation changes, and a control method thereof.

According to an aspect of the present invention, there is provided a relayed communication system having a supervising station and a plurality of communication stations and for transmitting data from the supervising station by relay transmission, the system comprising:

determination means for determining a communication quality between each of the plurality of communication stations and the supervising station; and notification means for notifying the communication quality determined by the determination means to the supervising station, wherein the supervising station having:

allocation means for, in a case that the communication quality notified by the notification means is equal to or greater than a predetermined value, allocating one or more communication stations as a relay station to respective time slots in a descending order of the communication quality; and transmission means for transmitting a result of allocation by the allocation means to the plurality of communication stations.

According to another aspect of the present invention, there is provided a method of controlling a relayed communication system having a supervising station and a plurality of communication stations and for transmitting data from the supervising station by relay transmission, the method comprising the steps of:

determining a communication quality between each of the plurality of communication stations and the supervising station;

notifying the communication quality determined in the determining step from the communication station to the supervising station;

allocating one or more communication stations as a relay station to respective time slots in a descending order of the communication quality, in a case that the notified communication quality is equal to or greater than a predetermined value; and transmitting a result of allocation in the allocating step to the plurality of communication stations from the supervising station.

According to another aspect of the present invention, there is provided a communication apparatus, comprising:

allocation means for allocating time slots in descending order of communication quality based on information transmitted from a plurality of communication stations, wherein the information indicates the communication quality between the communication apparatus and the communication stations or between the communication stations; and transmission means for transmitting a result of allocation by the allocation means to the plurality of communication stations.

According to another aspect of the present invention, there is provided a communication apparatus, comprising:

allocation means for allocating one or more communication stations as relay stations to respective time slots in descending order of communication quality based on information transmitted from a plurality of communication stations, wherein the information indicates the communication quality between the communication apparatus and the communication stations or between the communication stations; and transmission means for transmitting a result of allocation by the allocation means to the plurality of communication stations.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 8A to 8C depict views illustrating examples of notified wireless communication quality in the order of quality according to the first embodiment;

FIGS. 11A to 11C depict views illustrating examples of wireless communication quality in quality order according to the second embodiment;

FIGS. 13A to 13C depict views illustrating examples of wireless communication quality in quality order according to the third embodiment.

BEST MODE FOR CARRYING OUT THE INVENTION

Numerous embodiments of the present invention will now herein be described below in detail with reference to the accompanying drawings. The following embodiments are not intended to limit the claims of the present invention, and not all combinations of features described in the embodiments are essential to the solving means of the present invention.

Figure 1:
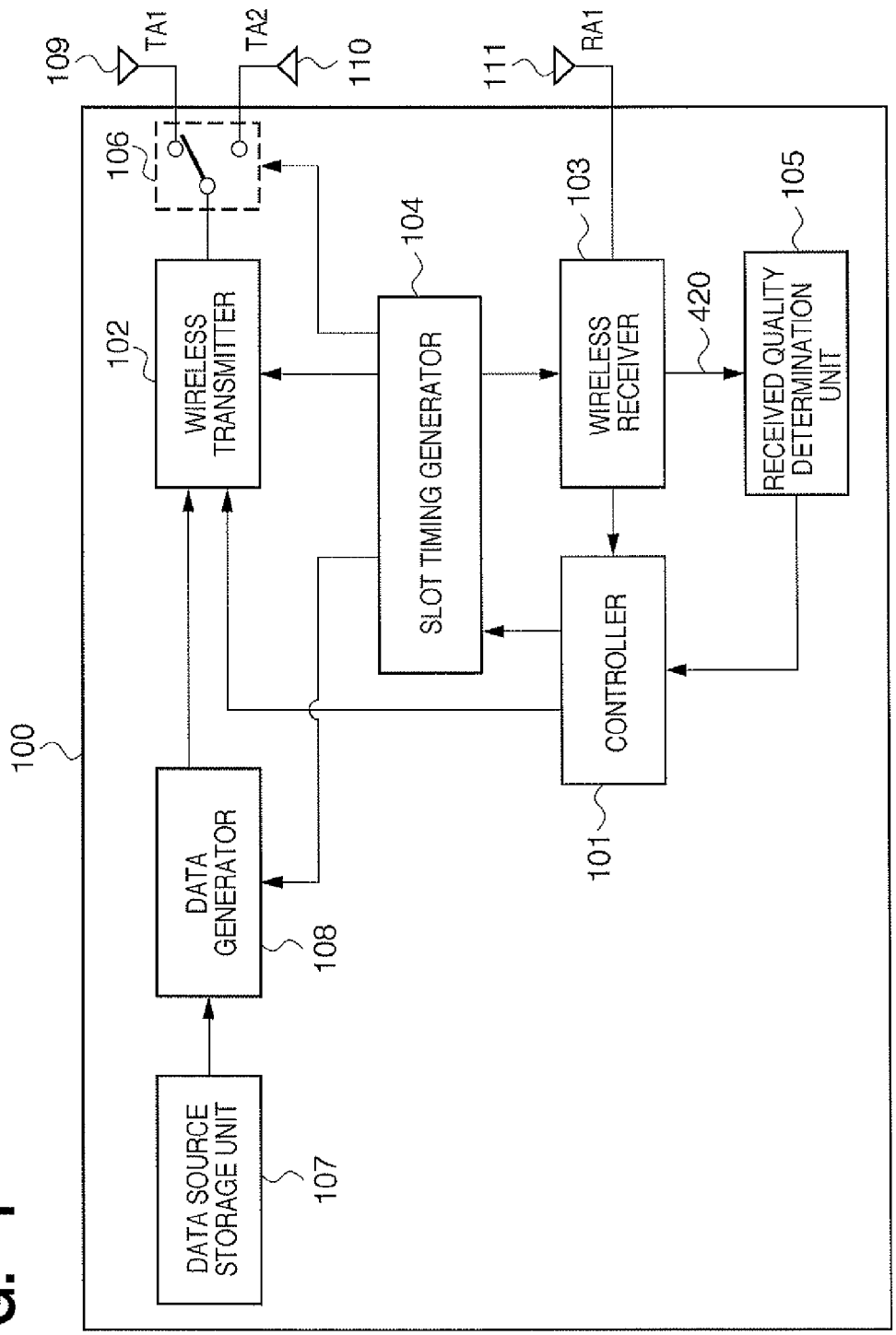
FIG. 1 is a block diagram describing the configuration of a root wireless communication apparatus used in a time division relayed communication system according to an exemplary embodiment of the present invention.

FIG. 1 is a block diagram illustrating the configuration of a root wireless communication apparatus 100 that is used in a time division relayed communication system according to an exemplary embodiment of the present invention.

Figure 2:
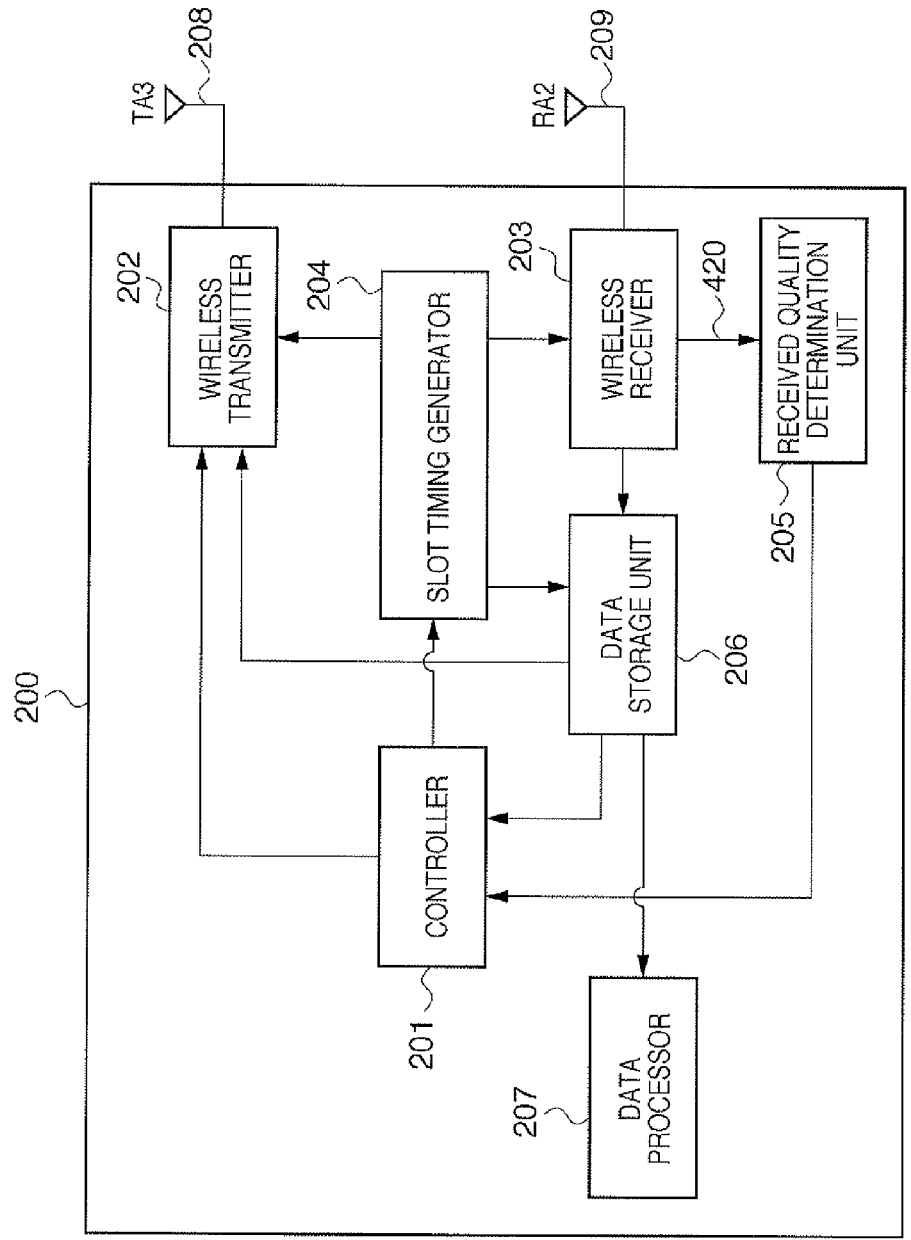
FIG. 2 depicts a view describing the configuration of a node wireless communication apparatus used in a time division relayed communication system according to the embodiments.

FIG. 2 is a view illustrating the configuration of a node wireless communication apparatus 200 that is used in the time division relayed communication system. In this case, the root wireless communication apparatus 100 generates stream data and transmits the stream data to a plurality of node wireless communication apparatuses (wireless communication stations) 200 within the time division relayed communication system. The node wireless communication apparatuses 200 receive and process the stream data that is generated by the root wireless communication apparatus 100, or transmit the stream data by relay transmission.

In FIG. 1, the root wireless communication apparatus (wireless supervising station) 100 includes a controller 101, a wireless transmitter 102, wireless receiver 103, a slot timing generator 104, a received quality determination (wireless communication quality determination) unit 105, a transmission antenna selector switch 106, and a data source storage unit 107. The root wireless communication apparatus 100 also includes a data generator 108, a first transmitting antenna 109 (TA1), a second transmitting antenna 110 (TA2), and a receiving antenna 111 (RA1). The communication quality indicates the quality of a wireless connection between a wireless supervising station 100 and a wireless communication station 200, or between wireless communication stations.

In FIG. 2, the node wireless communication apparatus 200 includes a controller 201, a wireless transmitter 202, a wireless receiver 203, a slot timing generator 204, a received quality determination unit 205, a data storage unit 206, and a data processor 207. The node wireless communication apparatus 200 also includes a transmitting antenna 208 (TA3) and a receiving antenna 209 (RA2).

The wireless transmitter 102 and wireless receiver 103 of the root wireless communication apparatus 100 according to the present embodiment contain an OFDM (Orthogonal Frequency Division Multiplexing) modem. The OFDM technique uses a BPSK (Binary Phase Shift Keying) modulation technique and a 64-QAM (64-position Quadrature Amplitude Modulation) modulation technique. The BPSK modulation technique offers a light processing burden and high error tolerance, and therefore information can be correctly transmitted to a far distance using the BPSK modulation technique. However, in the BPSK modulation technique, information transmission is at a low bit rate of 6 Mbps. The 64-QAM modulation technique involves a heavy processing burden and a low error tolerance. Therefore, the range in which information can be correctly transmitted is nearer than that of the BPSK modulation technique. However, with the 64-QAM modulation technique, information can be transmitted at a high bit rate of 54 Mbps. The OFDM technique uses a technique that is defined in IEEE 802.11a as standardized by the IEEE (Institute of Electrical and Electronics Engineers). A detailed description thereof is thus omitted here.

The wireless transmitter 202 and the wireless receiver 203 of the node wireless communication apparatus 200 also include a wireless modem that uses the same OFDM technique as described above.

Next, each unit of the root wireless communication apparatus 100 shown in FIG. 1 is described.

The data source storage unit 107 stores stream data of a plurality of channels, and outputs stream data of a plurality of channels at a predetermined bit rate in accordance with an instruction from the controller 101. According to the present embodiment, the stream data of a plurality of channels is sound source data of surround music. The data source storage unit 107 synchronously outputs a plurality of items of sound source data to cause each of a plurality of speakers to emit sound. The slot timing generator 104 generates timings of time-division time slots that execute transmission and reception of the root wireless communication apparatus 100. The data generator 108 performs temporary buffering of the stream data of a plurality of channels that is output from the data source storage unit 107. The data generator 108 subsequently constructs a single transmission frame from the stream data of a plurality of channels, and outputs the transmission frame to the wireless transmitter 102 once or repeatedly a plurality of times in accordance with a slot timing instruction from the slot timing generator 104. The wireless transmitter 102 modulates the input transmission frame to form a wireless signal, and transmits the wireless signal from the first transmitting antenna TA1 or the second transmitting antenna TA2 via the transmission antenna selector switch 106. The transmission antenna selector switch 106 switches a connection between the first transmitting antenna TA1 and the second transmitting antenna TA2 in accordance with an instruction from the slot timing generator 104. The wireless transmitter 102 modulates control data that is written from the controller 101 to form a wireless signal in the same manner as described above and transmits the wireless signal.

In accordance with an instruction from the slot timing generator 104, the wireless receiver 103 demodulates a wireless signal that is received with the receiving antenna 111 to generate reception data. The wireless receiver 103 passes the reception data to the controller 101. The wireless receiver 103 also supplies the demodulated signal of the received wireless signal to the received quality determination unit 105. Thus, the received quality determination unit 105 determines the quality of the reception signal to notify the controller 101 of the determined result.

Next, each unit of the node wireless communication apparatus 200 shown in FIG. 2 is described.

The slot timing generator 204 generates timings of time-division slots for transmission and reception of the node wireless communication apparatus 200. The wireless receiver 203 demodulates signals that are received with the receiving antenna RA2 according to instructions of the slot timing generator 204 to generate reception data, and transfers the reception data to the data storage unit 206. The wireless receiver 203 also supplies the demodulated signal of the received wireless signal to the received quality determination unit 205. Thus, the received quality determination unit 205 determines the quality of the reception signal to notify the controller 201 of the determined result.

The reception data that is stored in the data storage unit 206 is transferred to the data processor 207 in accordance with an instruction of the slot timing generator 204. Further, when performing a relayed transmission, the reception data stored in the data storage unit 206 is transferred to the wireless transmitter 202 in accordance with an instruction of the slot timing generator 204. When control data is written in the data storage unit 206, the controller 201 reads out the control data.

In accordance with an instruction of the slot timing generator 204, the wireless transmitter 202 modulates control data from the controller 201 or reception data from the data storage unit 206 into a wireless signal and transmits the wireless signal from the transmitting antenna TA3.

The data processor 207 reads out and processes channel data that is addressed to its own node from the stream data that is stored in the data storage unit 206. More specifically, the data processor 207 reads out only data of acoustic channels to be played back with the speaker of its own node from surround data of a plurality of channels that constitutes the stored reception data, and performs playback processing at the speaker (unshown). In this connection, the aforementioned wireless transmitter 102 (FIG. 1) and wireless transmitter 202 (FIG. 2) have the same configuration.

Figure 3:
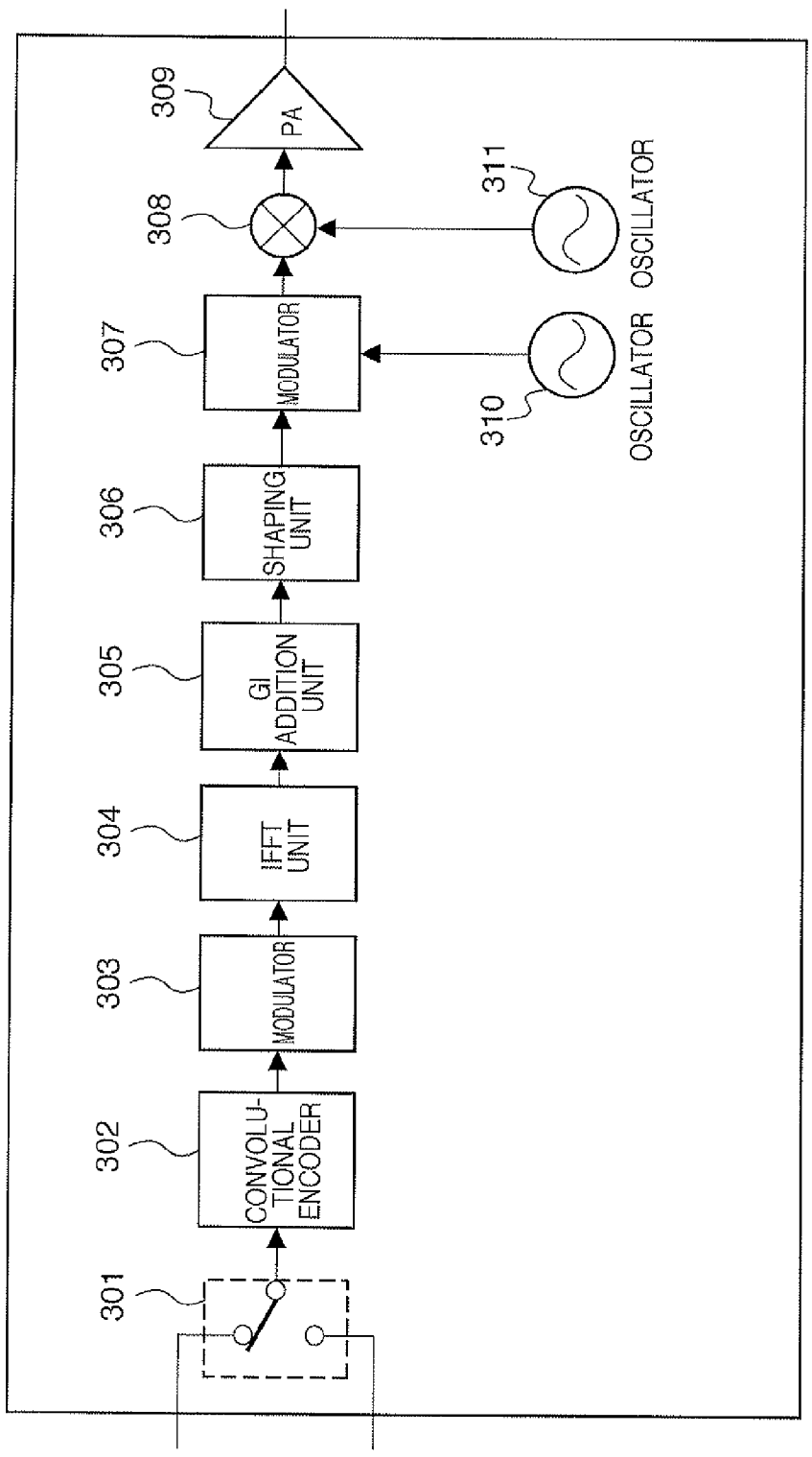
FIG. 3 is a block diagram describing the detailed configuration of a wireless transmitter according to the embodiments.

FIG. 3 is a block diagram illustrating the detailed configuration of the wireless transmitter 102 (202).

A switch 301 selects one input from two inputs and connects to an OFDM modulator. A convolutional encoder 302 performs redundancy encoding for error correction processing. A modulator 303 divides input data into data for each subcarrier and performs BPSK modulation and 64-QAM modulation processing. An IFFT unit 304 subjects each subcarrier signal that is modulated to Inverse Fourier transformation. A GI addition unit 305 adds a guard interval in order to remove the influence of a delayed interference wave. A shaping unit 306 performs waveform shaping processing for reducing out-band power. The convolutional encoder 302, the modulator 303, the IFFT unit 304, the GI addition unit 305, and the shaping unit 306 comprise the OFDM modulator. A modulator 307 performs quadrature modulation with an inter-frequency. A multiplier 308 converts the signals to a wireless carrier frequency. A PA 309 is a power amplifier (PA) that amplifies the wireless transmission power. An oscillator 310 generates the inter-frequency. An oscillator 311 generates the wireless carrier frequency.

The wireless receiver 103 (FIG. 1) and wireless receiver 203 (FIG. 2) have the same configuration.

Figure 4:
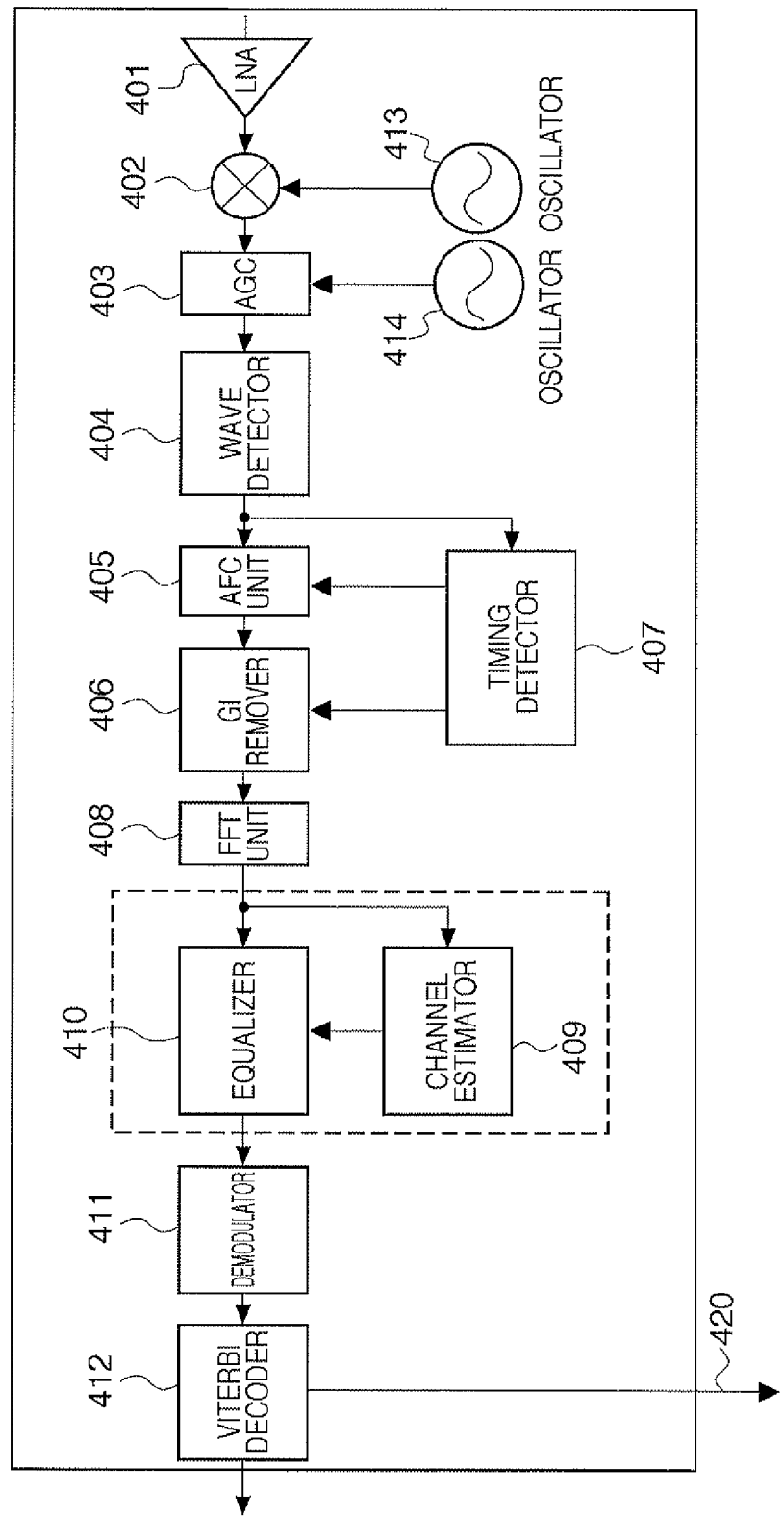
FIG. 4 is a block diagram describing the detailed configuration of a wireless receiver according to the embodiments.

FIG. 4 is a block diagram that illustrates the detailed configuration of the wireless receiver 103 (203).

Reference numeral 401 denotes a low noise amplifier (LNA) that amplifies a reception signal. A multiplier 402 fetches a signal that is tuned at a wireless carrier frequency. Reference numeral 403 denotes an automatic gain controller (AGC) that performs automatic gain control to make the signal strength a predetermined amplitude strength. A wave detector 404 converts a signal frequency into an inter-frequency and performs orthogonal detection. Reference numeral 405 denotes an automatic frequency control (AFC) unit 405 that corrects a wireless carrier frequency offset. A GI remover 406 removes a guard interval that is attached when transmitting. A timing detector 407 detects the frequency synchronization of a wireless carrier frequency, the frequency synchronization of an inter-frequency, and the synchronization timing of a frequency from the reception signal. An FFT unit 408 performs Fourier transformation to divide the reception data for each subcarrier. A channel estimator 409 estimates the transmission path distortion of subcarrier signals. An equalizer 410 removes the transmission path distortion from the reception data in accordance with the transmission path distortion that is estimated by the channel estimator 409. A demodulator 411 detects and corrects the phase of each subcarrier to restore the original data for each subcarrier. A Viterbi decoder 412 performs error correction of data that is convolutionally encoded to restore the data to the original data. The respective functional processors from the aforementioned AFC unit 405 to the Viterbi decoder 412 constitute an OFDM demodulator.

An oscillator 413 generates a wireless carrier frequency. An oscillator 414 generates an inter-frequency. In this case, the oscillator 310 (FIG. 3) and the oscillator 414 (FIG. 4) generate signals of the same frequency. Further, the oscillator 311 (FIG. 3) and the oscillator 413 (FIG. 4) generate signals of the same frequency.

The Viterbi decoder 412 also outputs a quality signal 420 that indicates the error occurrence rate of the reception data. The aforementioned received quality determination unit 105 (FIG. 1) and received quality determination unit 205 (FIG. 2) determine the received quality in accordance with the quality signal 420 and the rate of occurrence of any one of, or a plurality of, a bit error rate, a byte error rate, and a frame error rate.

Next, the time division relayed communication system according to the first embodiment is described.

Figure 5:
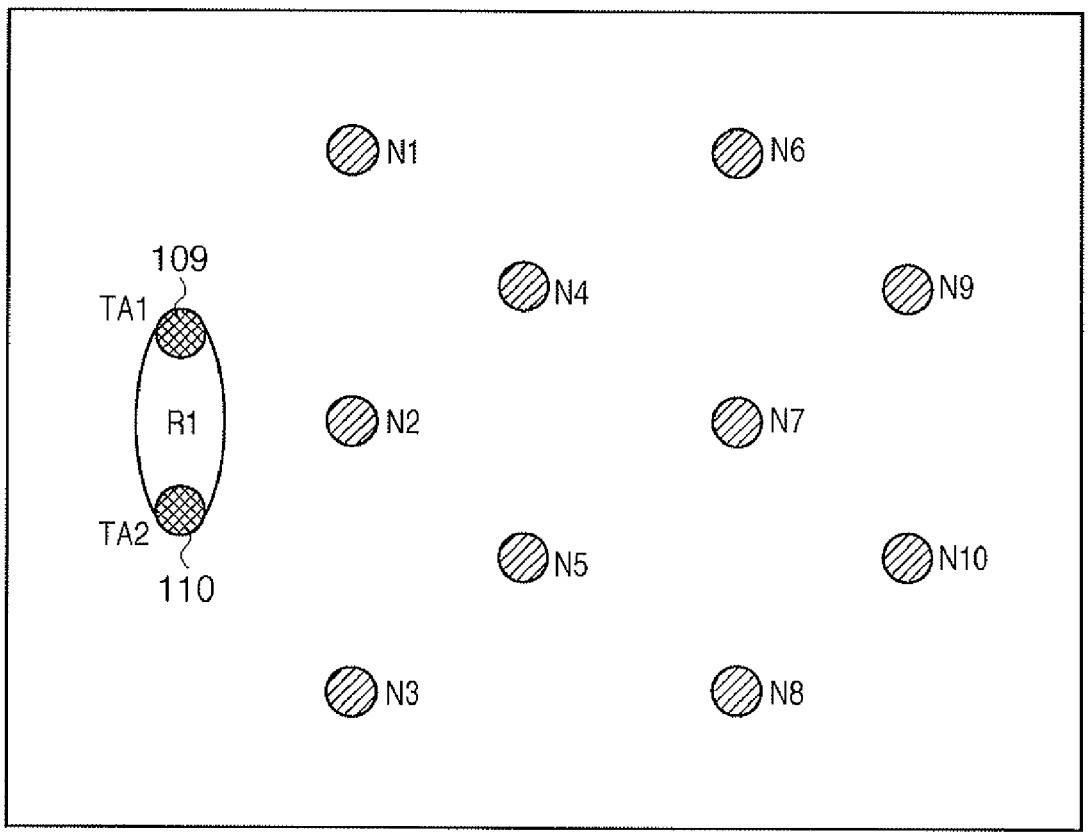
FIG. 5 depicts a view describing a configuration example of a time division relayed communication system that includes one root wireless communication apparatus and ten node wireless communication apparatuses, that applies a time-division communication system according to a first embodiment.

FIG. 5 depicts a view illustrating a configuration example of a time division relayed communication system that includes one root wireless communication apparatus 100 (R1) and ten node wireless communication apparatuses (N1 to N10) 200, that applies the time-division communication system according to the first embodiment.

In FIG. 5, reference symbol R1 denotes the root wireless communication apparatus 100, and reference numerals 109 and 110 denote the first transmitting antenna TA1 and the second transmitting antenna TA2, respectively. R1 also includes a receiving antenna 111 (FIG. 1). Reference symbols N1 to N10 each denotes a node wireless communication apparatus 200. N1 to N10 are provided with the transmitting antenna 208 (TA3) and the receiving antenna 209 (RA2), respectively. Hereunder, when providing a description using the symbols R1 and N1 to N10, the character R denotes "root" and the character N denotes "node".

In this connection, FIG. 5 depicts a view showing the arrangement of the root wireless communication apparatus 100 (R1) and the node wireless communication apparatuses 200 (N1 to N10) when viewed from above. That is, FIG. 5 is a view that shows a state in which the nodes N1, N2 and N3 are disposed at positions that are near to the root wireless communication apparatus 100 (R1), and the nodes N9 and N10 are disposed at positions that are far from the root R1.

According to this time division relayed communication system, in each period of synchronization period Ts, stream data comprising frames that include all channel data to be processed by the respective node wireless communication apparatuses 200 is transmitted by broadcast transmission to all the node wireless communication apparatus 200 from the root R1. Further, a node wireless communication apparatus that is designated as a relay terminal by an instruction from the root R1 relays the received stream data by broadcast transmission so that the stream data can be received by node wireless communication apparatuses that are located further away from the root R1. In this case, the term "broadcast transmission" refers to data transmission in which the destination of the data is not specified.

Prior to communication of the stream data, the root R1 and the nodes N1 to N10 perform training processing with another of the nodes N1 to N10 to determine the communication quality using a query signal and a reply signal.

FIG. 6A to FIG. 6D depict views describing the data structure of frames that are exchanged in the time division relayed communication system according to the present embodiment.

Figure 6A:
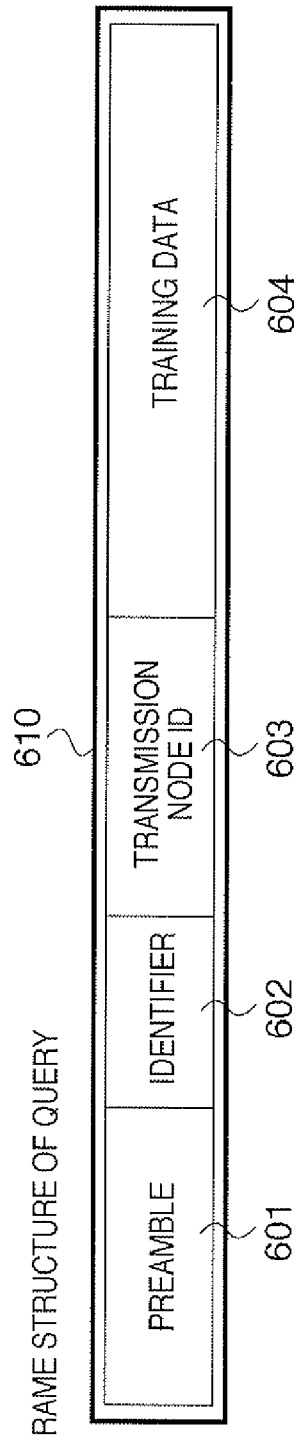
FIGS. 6A to 6D depicts views describing the data structure of frames that are exchanged in a time division relayed communication system according to the embodiments.
Figure 6B:
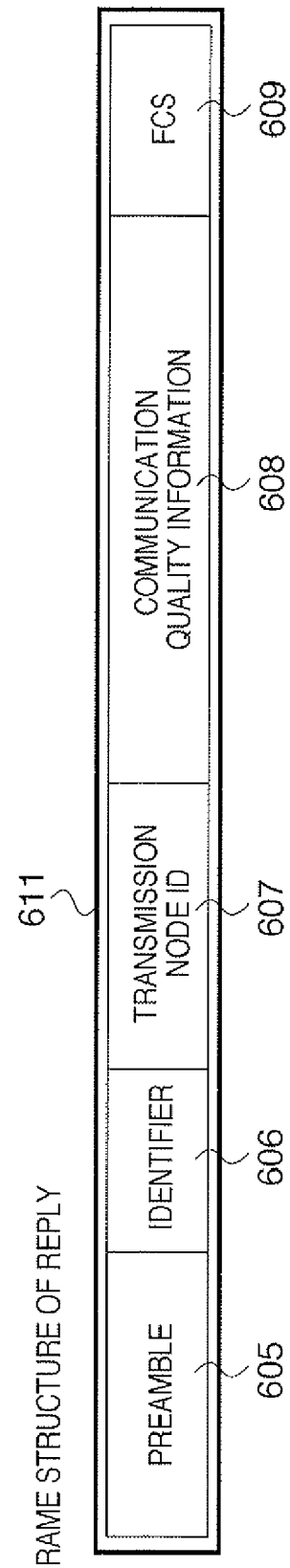

FIG. 6A shows the frame format of a query signal 610, and FIG. 6B shows a frame format of a reply signal 611.

The query signal 610 includes a preamble 601, an identifier 602, a transmission node ID 603, and training data 604.

The preamble 601 is a signal that is used for reception synchronization of the wireless signal by the timing detector 407 of the node wireless communication apparatus 200 on the receiving side. The preamble 601 comprises a fixed waveform pattern. The identifier 602 is information that indicates that the frame in question is a query signal. The transmission node ID 603 describes a unique number that identifies the apparatus that transmits this frame. The identifier 602 and the transmission node ID 603 are transmitted using the BPSK modulation technique. The training data 604 consists of a predetermined fixed data pattern, and is transmitted using the 64-QAM modulation technique. With respect to the training data 604 in the query signal that is received, the received quality determination unit 205 of the node wireless communication apparatus 200 acquires the quality signal 420 to determine the communication quality of the training data 604.

It is thereby possible for the node wireless communication apparatus 200 on the receiving side to detect the communication quality.

The node wireless communication apparatus 200 employs this information regarding the detected reception quality as well as the transmission node ID 603 that indicates the source of the query signal 610 as communication quality information to create and return the reply signal 611 shown in FIG. 6B.

In the reply signal 611, a preamble 605 is the same as the aforementioned preamble 601. An identifier 606 is information that indicates that the frame is a reply signal. A transmission node ID 607 describes a unique number that identifies the node wireless communication apparatus 200 that transmits the reply signal. Thereafter, communication quality information 608 that is described above is added. An error-detecting code FCS 609 for determining the existence or non-existence of an error in frame data of the reply signal is added thereafter. This entire reply signal is transmitted using the BPSK modulation technique.

Figure 7:
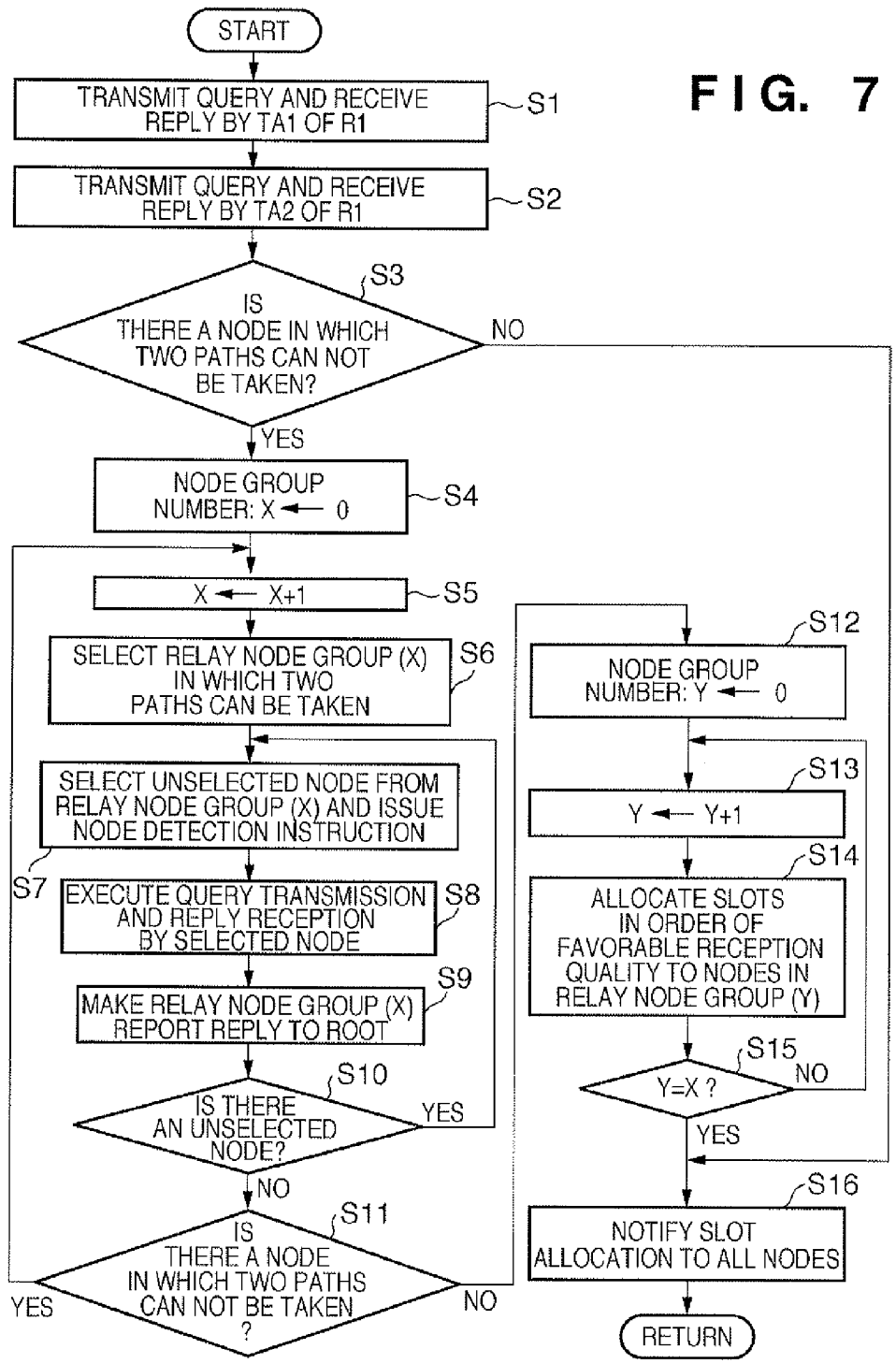
FIG. 7 is a flowchart explaining operations of time slot determination processing of the time division relayed communication system shown in FIG. 5.

FIG. 7 is a flowchart describing the operations of time slot determination processing in the time division relayed communication system shown in FIG. 5.

First, in step S1, prior to transmission of stream data, the root R1 transmits a query signal for detecting the communication status of the plurality of node wireless communication apparatuses 200 that are disposed in the area surrounding the root R1 from the transmitting antenna (TA1) 109 by broadcast transmission. The node wireless communication terminals N1 to N10 respectively receive the query signal and transmit a reply signal to the root R1 in response to the query signal. A quality signal 420 that indicates the quality when the query signal is received is added to the reply signal. Thus, the root R1 collects information regarding the communication quality with respect to each node wireless communication apparatus 200 in a case that the transmitting antenna (TA1) 109 is used.

In step S2, similarly to the above described step S1, the root R1 transmits a query signal, although this time the root R1 uses the transmitting antenna (TA2) 110. Subsequently, the root R1 receives the reply signals in response to the query signal. Thereby, the root R1 collects information regarding the communication quality with respect to each node wireless communication apparatus 200 in a case that the transmitting antenna (TA2) 110 is used.

Based on the information regarding the communication quality with each node wireless communication apparatus that is collected in this manner, the root R1 places the communication quality with each node wireless communication apparatus in an ordered sequence as shown in FIG. 8A to compare the communication quality for each node.

Figure 8C:
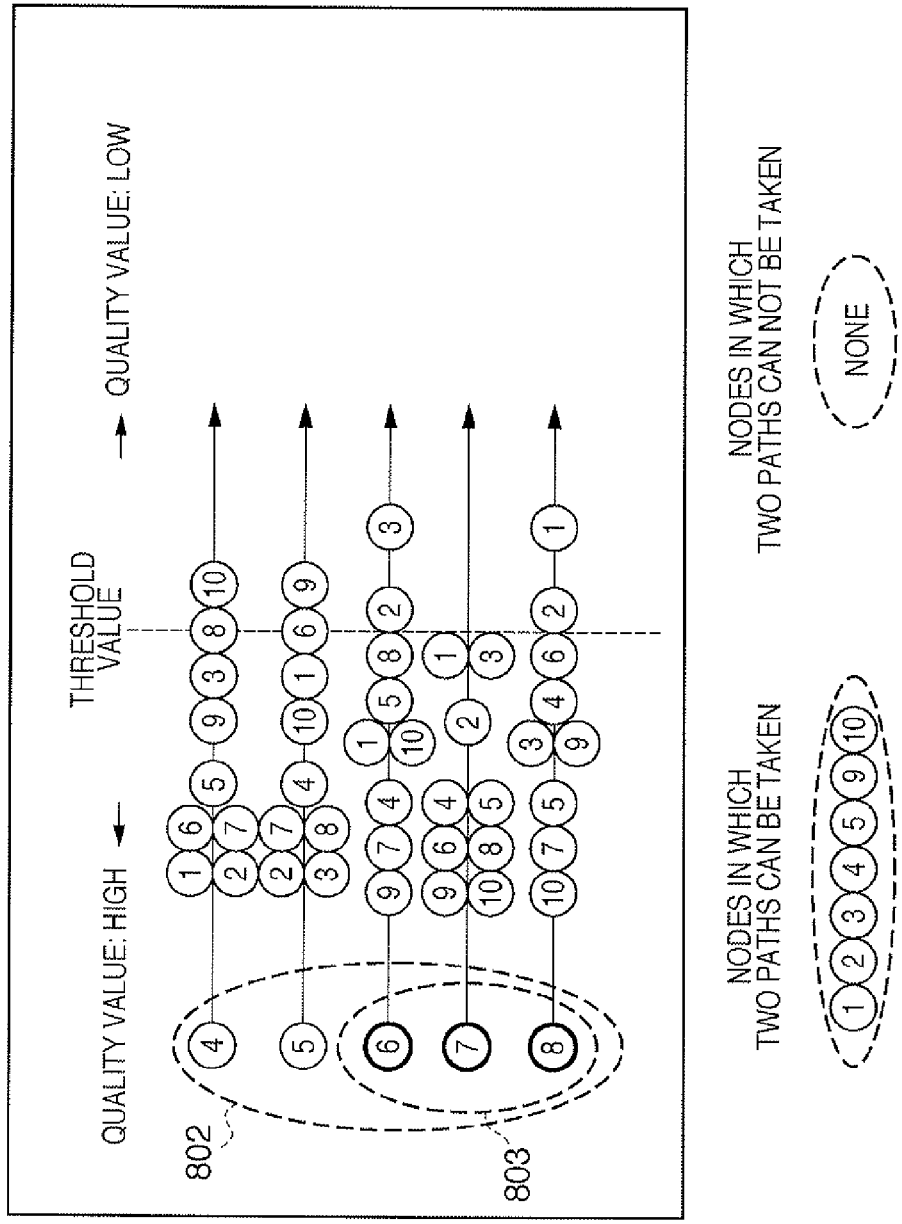

FIGS. 8A to 8C depict views in which notified levels of wireless communication quality are arranged in the order of communication quality. In FIGS. 8A to 8C, the circled numerals denote node numbers. More specifically, the circled numeral "1" denotes the node wireless communication apparatus 200 (N1) and the circled numeral "2" denotes the node wireless communication apparatus N2. Likewise, the circled numerals 3 to 10 denote the nodes N3 to N10, respectively. Further, R1/TA1 denotes a case in which the transmitting antenna (TA1) 109 is used and R1/TA2 denotes a case of using the transmitting antenna (TA2) 110.

Next, in step S3, the root R1 identifies node wireless communication apparatuses in which two paths that are communication paths having a predetermined communication quality or more (predetermined quality values or more) can be taken, and node wireless communication apparatuses in which two paths cannot be taken, to determine whether or not there is a node wireless communication apparatus in which two paths can not be taken. In this case, the term "two paths" corresponds to the root wireless communication apparatus 100 and the node wireless communication apparatuses 200, or node wireless communication apparatuses 200 together (wireless stations together) being capable on communicating via a plurality of wireless communication paths. In step S3, when the root R1 determines that there is no node wireless communication apparatus in which two paths can not be taken (two paths can be taken for communication with all node wireless communication apparatuses), the process proceeds to step S16 to execute processing for slot allocation notification. That is, in this case, if the transmitting antenna TA1 and transmitting antenna TA2 of the root R1 are allocated in sequence to the time slots, signals can be favorably received by all the node wireless communication apparatuses 200. Accordingly, the root R1 determines that relay transmission using another node wireless communication terminal is unnecessary.

In FIG. 8A, as denoted by reference numeral 810, nodes N1, N2, and N3 are favorable node wireless communication apparatuses in which two paths can be taken. Regarding the order, since the node N2 is the most favorable, the node N2 becomes the first. Further, although the nodes N1 and N3 are almost the same, but since the transmitting antenna TA1 is the transmitting antenna that transmits first, the node N1 that has a more favorable connection with the transmitting antenna TA1 becomes the second, and the node N3 becomes the third. Furthermore, as denoted by reference numeral 811, the nodes N4, N5, N6, N7, N8, N9, and N10 are node wireless communication apparatuses in which two paths can not be taken. Accordingly, in the case shown in FIG. 8A, the root R1 determines in step S3 that there is a node in which two paths can not be taken, and the process proceeds to step S4 and thereafter.

In step S4, the value of a parameter X that represents a node group is initialized to "0". In this case, the term "node group" refers to a set of one or a plurality of nodes for which the number of relay stages of a communication path that enables favorable communication with the root R1 is the same value. More specifically, the term "node wireless communication apparatuses of node group 1" denotes nodes for which favorable communication is possible from the root R1 using a single path without any relay. Further, the term "node wireless communication apparatuses of node group 2" denotes a group of nodes for which favorable communication is possible from the root R1 using the two paths, that is, using a relay once.

Next, in step S5, the root R1 adds "1" to the parameter X at the beginning of repetition processing. Subsequently, in step S6, the root R1 selects a relay node group 1 for which there are two paths for which the communication quality is equal to or greater than the threshold value.

For the case shown in FIG. 8A, the aforementioned nodes N1, N2, and N3 are selected as node group 1 (801) (FIG. 8B).

Next, in step S7, the root R1 selects an unselected node in the order of favorable quality from among the nodes N1, N2, and N3 of the selected node group 1, and transmits a detection instruction command to cause the selected node to execute node detection and report the result.

Figure 6C:
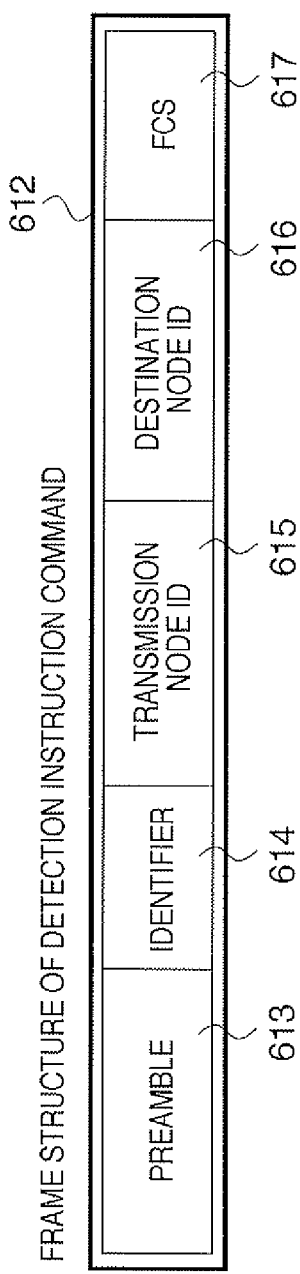

The detection instruction command is one of the control commands, and the frame structure thereof is shown in FIG. 6C.

As shown in FIG. 6C, the detection instruction command 612 includes a preamble 613, an identifier 614, a transmission node ID 615, a destination node ID 616 that shows a node that is to receive this command, and an FCS 617. This frame is transmitted using the BPSK modulation technique.

Each node that receives the detection instruction command 612 determines whether the value of the destination node ID 616 specifies its own node. If the destination node ID 616 specifies its own node, the relevant node recognizes that its own terminal is instructed to execute the relay detection. The instructed node transmits a query signal in the same manner as the aforementioned root R1 to detect the connection status with other node wireless communication apparatuses.

In step S8, the node receives reply signals from other node, the node that transmits the query signal in step S7 acquires information regarding the quality of wireless communication between its own node and the surrounding plurality of nodes. In step S9, the instructed node notifies the root R1 of the wireless communication quality information between the surrounding plurality of nodes.

Subsequently, in step S10, the root R1 determines whether or not there is a node that has not yet been selected in step S7 in the relay node group 1 (801) that is selected in step S6. In this case, if there is an unselected node, the process returns to step S7 to select the node and execute the aforementioned steps S7 to S9 so that the selected node notifies information regarding the communication quality with surrounding nodes to the root R1 in the same manner as described above.

Thus, the root R1 acquires communication quality information from all the nodes in the relay node group 1 (801). Based on the acquired communication quality information, as shown in FIG. 8B, the root R1 sequentially orders and compares the nodes according to the level of communication quality from the relay node group 1 (801).

In FIG. 8B, it can be determined that when the nodes N2, N1, and N3 serve as relay wireless stations for relayed transmission, two paths having a communication quality being greater than or equal to the threshold value can be taken to the nodes N4, N5, N6, N7, and N8. It can also be determined that, in contrast, the two paths can not be taken to the nodes N9 and N10.

Therefore, in step S11, the root R1 determines whether or not a node exists in which the two paths can not be taken. In this case, since nodes N9 and N10 still remain, the process of the root R1 returns to step S5.

In step S5, "1" is added to the value of parameter X once more. Thus, the value of parameter X is now "2". Therefore, in step S6, the root R1 selects a relay node group 2 for which there are the two paths having a communication quality being greater than or equal to the threshold value. For the case shown in FIG. 8B, nodes N4, N5, N6, N7, and N8 are selected as the node group 2 (802) (FIG. 8C).

Thereafter, in the same manner as described above, in step S7, the root R1 selects an unselected node in the order of communication quality from the nodes N4 to N8 of the selected node group 2 (802), and transmits the detection instruction command 612 to cause the selected node to execute node detection and report the result.

Each node that receives the detection instruction command 612 determines whether the value of the destination node ID 616 specifies its own node. If the destination node ID 616 specifies its own node, the relevant node recognizes that its own terminal is instructed to perform detection as a relay station. The instructed node transmits a query signal in the same manner as the aforementioned node N1 and the like in step S8, in order to detect the connection status with surrounding nodes. Thereafter, by receiving reply signals, the node in question acquires information regarding the quality of wireless communication between its own terminal and the surrounding plurality of nodes. In step S9, the instructed node notifies the quality information to the root R1.

As a result, in step S10, the root R1 determines whether or not there is a node that was unselected in step S7 in the relay node group 2 (802) that is selected in step S6. When there is an unselected node, the process returns to step S7 to select the node and execute the aforementioned steps S7 to S9 so that the selected node notifies information regarding communication quality with other nodes to the root R1.

Upon acquiring information regarding communication quality from all nodes of the relay node group 2 (802) in this manner, the root R1 sequentially orders the nodes according to the level of communication quality from the relay node group 2 (802), as shown in FIG. 8C, based on the acquired communication quality information.

According to FIG. 8C, it can be determined that when the nodes N6, N7, and N8 perform relay transmission, two paths having a communication quality being greater than or equal to the threshold value can be taken to the nodes N9 and N10. Thus, since the two paths are already secured to the other nodes, it is found that it is not necessary to select the nodes N4 and N5 as relay terminals. It can also be determined that there are no node in which the two paths can not be taken.

Accordingly, the nodes N6, N7 and N8 are taken as the selected node group 2 (803). At this time, in step S11, the root R1 determines that there are no node in which the two paths can not be taken, and thus the process proceeds to step S12.

When the above described processing terminates, the process of the root R1 proceeds to step S12 to initialize a second node group parameter Y to "0". Subsequently, in step S13, the root R1 adds "1" to the value of the second node group parameter Y. Next, in step S14, the root R1 allocates time slots for wireless transmission timing in the order of favorable communication quality to the nodes in the relay node group (Y) that is selected by the aforementioned processing.

Figure 9A:
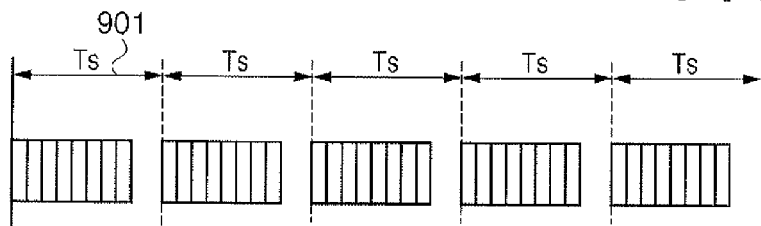
FIGS. 9A to 9C depict views illustrating examples of the state of time-division time slots in the time division relayed communication system according to the first embodiment.
Figure 9B:
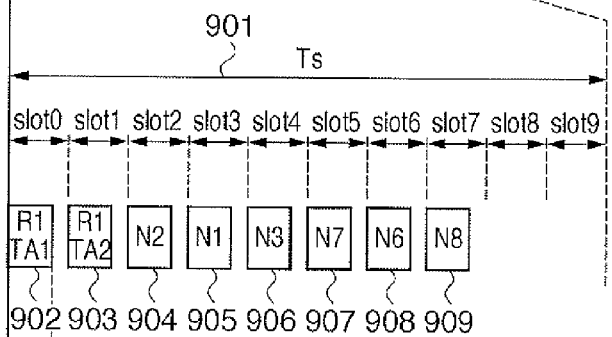

The time slot configuration is described in detail later. However, in this connection, the time of a time division communication repetition period Ts is further divided into slots 0 to 9 as shown in FIG. 9B. The slot 0 and slot 1 are pre-allocated as slots for transmission by the transmitting antenna TA1 and the transmitting antenna TA2 of R1 that is the source of the data. According to the present embodiment, with respect to the relay node group 1 (801), as shown in FIG. 8A, since the node N2 offers the most favorable communication quality, slot 2 is allocated for the transmission timing of the node N2. Next, since the nodes N1 and N3 offer the same level of communication quality, the node number sequence is used such that the transmission timing of the node N1 is allocated to slot 3 and the transmission timing of the node N3 is allocated to slot 4.

When the allocation of slots for the node group 1 (801) in this manner in step S14 ends, the process proceeds to step S15. In step S15, the aforementioned node group parameter X and second node group parameter Y are compared to determine whether or not there is a node group for which slots have not been allocated. As described above, since the node group parameter X is "2" and the node group parameter Y at this stage is "1", the root R1 determines that there is still a node group for which slots have not been allocated and returns to step S13. In step S13, the root R1 increments the value of Y by "1" so that the value for Y is now "2". The process of the root R1 proceeds to step S14 to allocate slots in the same manner as described above for the relay node group 2 (802).

As described above, since it is not necessary to allocate slots to the nodes N4 and N5, the three nodes N6, N7, and N8 among the nodes of the node group 2 (802) are a node group 2 (803) that are selected as nodes to act as tertiary relay nodes. Further, the nodes N9 and N10 are nodes in which the two paths having a communication quality being greater than or equal to the threshold value can not yet be secured. Therefore, in step S14, slots are allocated in accordance with the communication quality between the three nodes N6, N7, and N8 that act as relay nodes and the nodes N9 and N10 that are receiving nodes.

In this case, as shown in FIG. 8C, since the node N7 is the node that connects with the best communication quality to both nodes N9 and N10, following the aforementioned allocation of slot 4, the transmission timing of the node N7 is allocated to slot 5. Next, since the nodes N6 and N8 offer the same level of communication quality, the node number sequence is used such that the transmission timing of the node N6 is allocated to slot 6 and the transmission timing of the node N8 is allocated to slot 7 (FIG. 9B).

When the allocation of slots for the selected node group 2 (803) in this manner in step S14 ends, the operation again proceeds to step S15. In step S15, the node group parameter X and second node group parameter Y are again compared to determine whether or not there is a node group for which slots are unallocated. In this case, since the value of the node group parameter Y is "2", and thus matches the value of the node group parameter X which is also "2", the root R1 determines that there is no node group for which slots are unallocated. Therefore, the process exits the processing loop and proceeds to step S16. In step S16, the root R1 constructs a frame of a slot notification command using the allocation information regarding the slot arrangement that is determined as described above, and transmits the slot notification command to all of the node wireless communication apparatuses.

Figure 6D:
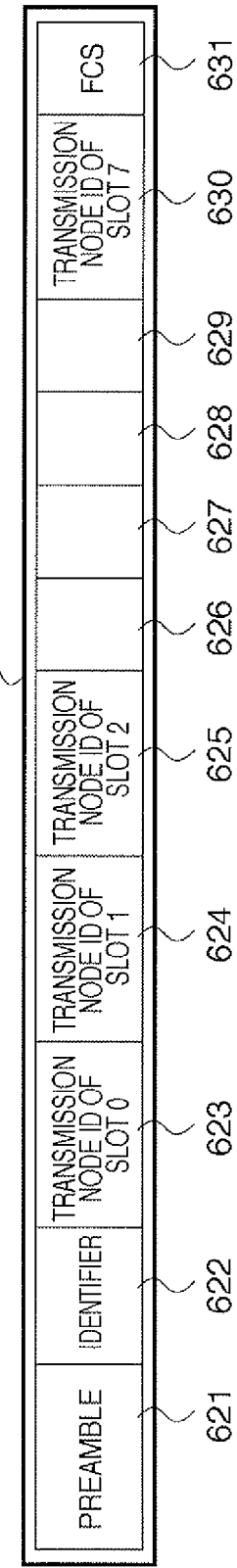

FIG. 6D depicts a view illustrating the frame structure of a slot notification command 620.

In FIG. 6D, reference numeral 621 denotes a preamble and reference numeral 622 denotes an identifier of this frame. Reference numerals 623 to 630 respectively show the transmission node IDs that are allocated to slot 0 to slot 7. Reference numeral 631 denotes an FCS as an error correcting code. This slot notification command 620 is modulated and transmitted using a BPSK modulation technique.

In the first embodiment, in correspondence with the slot allocation shown in FIG. 9B, an ID indicating the transmitting antenna TA1 of the root R1 is stored in the transmission node ID 623 of slot 0. Likewise, an ID indicating the transmitting antenna TA2 of the root R1 is stored in the transmission node ID 624 of slot 1. Further, an ID indicating the node N2 is stored in the transmission node ID 625 of slot 2. Similarly, IDs indicating the nodes N1, the node N3, the node N7, the node N6, and the node N8 are stored in the transmission node IDs 625 to 630 of slots 3 to slot 7, respectively.

Each node receives the slot notification command 620 and identifies which node has the transmission right for the respective slots. If the ID of its own node is in a slot, the relevant node performs relay transmission of reception data at the timing of that slot.

The root R1 and each node continuously carry out reception of transmission data from other nodes at times other than the transmission timing of their own node to thereby perform synchronization with respect to the time division period Ts and the slot timing for slot 0 to slot 9.

The state of time-division time slots for wireless communication in the time division relayed communication system according to the first embodiment will now be described referring to FIG. 9A to FIG. 9C.

The time division relayed communication system according to the present embodiment repeats time-division synchronous transfer in a time period Ts (901). The time period Ts is divided into time slots from slot 0 to slot 9.

As described above, according to the present embodiment, it is previously determined that data 902 is transmitted from the transmitting antenna TA1 of the root R1 at slot 0, and that data 903 is transmitted from the transmitting antenna TA2 of the root R1 at slot 1. For slot 2 and the subsequent slots, nodes that are allocated with transmitting slots by the root R1 execute transmission of data 904 to data 909, respectively, at the timing of the slot allocated to the relevant node.

The data transmission at slot 0 is the start of the time period Ts (901) and serves as a reference timing that synchronizes the entire system. Further, even a node that cannot receive the data of slot 0 can estimate the timing of slot 0 by receiving the data of another time-division slot. In this way, it is possible for the node to synchronize with the time period Ts.

In the above described first embodiment, slot 8 and slot 9 are unused. In the interval of these unused slots, up-link communication to the root R1 can be executed from each node.

Figure 9C:
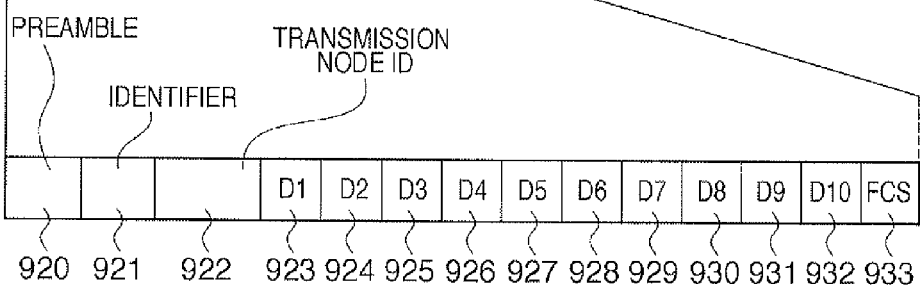

In each slot, the root R1 and a node which is instructed to perform relay transmission broadcast data having the frame structure shown in FIG. 9C.

In FIG. 9C, reference numeral 920 denotes a preamble and reference numeral 921 denotes an identifier that shows the data is a data frame. Reference numeral 922 denotes a transmission node ID that identifies the node that transmits the frame. Reference numerals 923 to 932 denote data D1 to D10 for nodes N1 to N10, respectively. Reference numeral 933 denotes an FCS as an error correcting code.

The single frame shown in FIG. 9C includes data for all the node. A node that acts as a relay node rewrites only the ID of its own node into the transmission node ID 922 of the received frame, and transmits the frame data in succession by relay transmission. Accordingly, within the time period Ts, the data of this frame is distributed by two or more communication paths to all the nodes.

According to the above configuration, two or more wireless communication paths can be secured to all the nodes. Therefore, even if one communication path is obstructed by some kind of obstacle, a frame with the same contents can be received within the time period Ts using the remaining communication path.

Further, since the more favorable path is used first for relaying, deterioration in the quality of data that is transmitted by relay is reduced. Consequently, all nodes can receive data with few errors.

Second Embodiment

According to the above described first embodiment, a case was described in which, prior to transmission of stream data, the root wireless communication apparatus gathers communication quality information from the node wireless communication apparatuses to determine the time slots. However, a configuration may also be adopted in which the root wireless communication apparatus also gathers communication quality information during communication of stream data, and when a decline in communication quality is detected, performs reallocation and notification of time slots to thereby adaptively change the time slots during communication of stream data.

According to the second embodiment, a decline in communication quality is detected in the following manner. In the second embodiment, the time division relayed communication system and the root wireless communication apparatus and the node wireless communication apparatus have the same structure as those in the first embodiment. Accordingly, the descriptions of them are omitted.

First, each node periodically measures the communication quality when stream data is received and notifies the results to the root wireless communication apparatus 100. Based on the notified results, the root wireless communication apparatus 100 detects a decline in the communication quality. The detection will now be described in further detail.

First, when receiving stream data, the received quality determination unit 205 of each node wireless communication apparatus 200 also acquires the quality signal 420 from the Viterbi decoder 412 to determine the communication quality in the same manner as for the aforementioned training data in the first embodiment. Further, the notification timing for a reply signal is set at the rate of once per every 100 time periods Ts. Thus, at the timing of slot 8 and slot 9 that are empty slots as described in the first embodiment, the node wireless communication apparatus 200 transmits a reply signal to the root wireless communication apparatus 100 or a node wireless communication apparatus 200 that is the source of the stream data. In this case, if another node wireless communication apparatus is transmitting at the time the node wireless communication apparatus 200 in question is to transmit a reply signal, the node wireless communication apparatus 200 in question waits until the next slot or the next time period Ts to perform transmission. Further, if a node wireless communication apparatus receives a reply signal, the node wireless communication apparatus transmits it to the root wireless communication apparatus 100.

The root wireless communication apparatus 100 is in a receiving state in the time period from slot 2 to slot 9. When the root wireless communication apparatus 100 receives the aforementioned reply signal, the root wireless communication apparatus 100 updates the above described tables shown in FIG. 8A to FIG. 8C with the new signal quality. If the signal quality of a node having a quality being greater than or equal to the threshold value becomes less than the threshold value, the root wireless communication apparatus 100 executes the time slot determination processing described in the aforementioned FIG. 7 once more.

Next, the root wireless communication apparatus 100 transmits the determined time slots to all nodes using the slot notification command 620. All the node wireless communication apparatuses 200 that receive the slot notification command 620 start time division communication using the new time slots, and the root wireless communication apparatus 100 resumes transmission of stream data.

Figure 10:
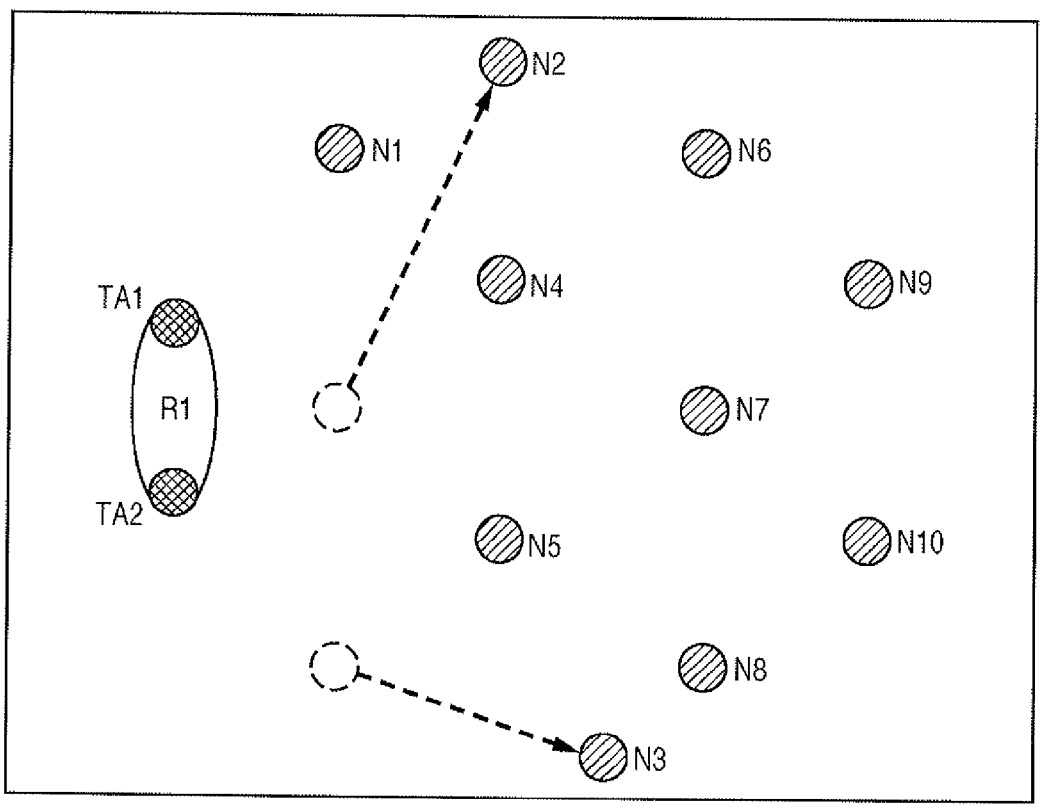
FIG. 10 depicts a view illustrating the positional relationship of each node wireless communication apparatus in a case in which node wireless communication apparatuses N2 and N3 move, according to a second embodiment of the present invention.

FIG. 10 depicts a view illustrating the positional relationship of each node in the second embodiment. In FIG. 10, node N2 and N3 move with reference to the case of FIG. 5. In this case, since the nodes N2 and N3 move away from the root R1, the communication quality between the root R1 and the nodes N2 and N3 declines.

Upon receiving reply signals from the nodes N2 and N3, the root R1 executes time slot determination processing.

As shown in FIG. 11A, tables are created for the new signal quality. At this time, the only node in which two paths for which the communication quality is greater than or equal to the threshold value can be taken is the node N1. Thus, the root R1 employs the node N1 as a relay terminal. Further, based on the communication quality information that is notified by the node N1, the root R1 creates a communication quality table as shown in FIG. 11B. At this time, the nodes N4 and N5 are already receiving signals from the root R1 using one path having a communication quality being greater than or equal to the threshold value as shown in FIG. 11A. Hence, the root R1 can determine that, by combining that path with the one path having the communication quality from the node N1, two paths having the communication quality being greater than or equal to the threshold value can be taken to the nodes N4 and N5.

Therefore, the root R1 employs the nodes N4 and N5 as tertiary relay terminals (tertiary relay stations), and based on communication quality information that is notified by the nodes N4 and N5, creates a communication quality table as shown in FIG. 11C. Based on the table shown in FIG. 11C, it is found that two paths having the communication quality being greater than or equal to the threshold value can be taken to all of the remaining nodes.

Subsequently, the root R1 allocates the node N1 to slot 2, allocates the node N4 to slot 3, and allocates the node N5 to slot 4. The remaining slots, slot 5 to slot 9, are empty slots. As described above, slot 0 is used for transmitting from the antenna TA1 of the root R1, and slot 1 is used for transmitting from the antenna TA2 of the root R1.

The root R1 notifies the time slot allocation that is decided in this manner to all nodes using the slot notification command 620 frame, and continues transmission of stream data based on the new slot allocation timing.

Thus, according to the second embodiment it is possible to adaptively change time slots even during communication. Therefore, even if one communication path is obstructed by some kind of obstacle, a frame with the same contents can be received in the time period Ts using the remaining communication path. Further, since the more favorable path is used first for relaying, deterioration in the quality of data that is transmitted by relay is reduced. Consequently, all nodes can receive data with few errors.

Third Embodiment

Figure 12:
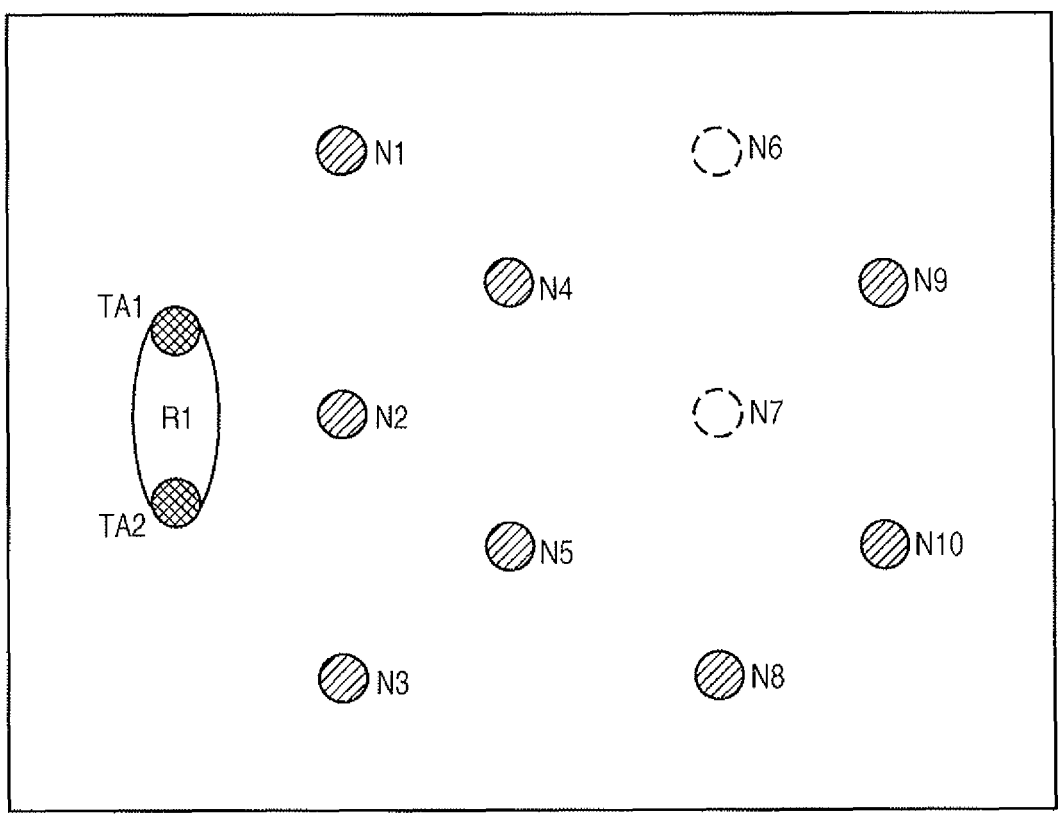
FIG. 12 depicts a view illustrating a configuration example of a time division relayed communication system that includes one root wireless communication apparatus and ten node wireless communication apparatuses, that applies a time-division communication system according to a third embodiment.

As a further embodiment of the present invention, an example is described hereafter in which, when reception quality declines to a level at which communication is not possible, such as in a case where a node wireless communication apparatus is inoperable, the information of the node for which the reception quality has declined is erased and the time slots are reallocated based on the remaining information. Here, a case is described in which, in the time-division communication system described in the above first embodiment, the nodes N6 and N7 enter a state in which they are unable to communicate during communication, as shown in FIG. 12. In the third embodiment, the time division relayed communication system and the root wireless communication apparatus and the node wireless communication apparatus have the same structure as those in the first embodiment. Accordingly, the descriptions of them are omitted.

When the nodes N6 and N7 are unable to communicate due to some cause and relay transmission stops, the surrounding nodes are no longer able to receive stream data for slot 6 and slot 5. As a result, the nodes that can not receive the stream data transmit a reply signal in which the communication quality for the nodes N6 and N7 is zero, the lowest value, to the root R1.

Figure 13A:
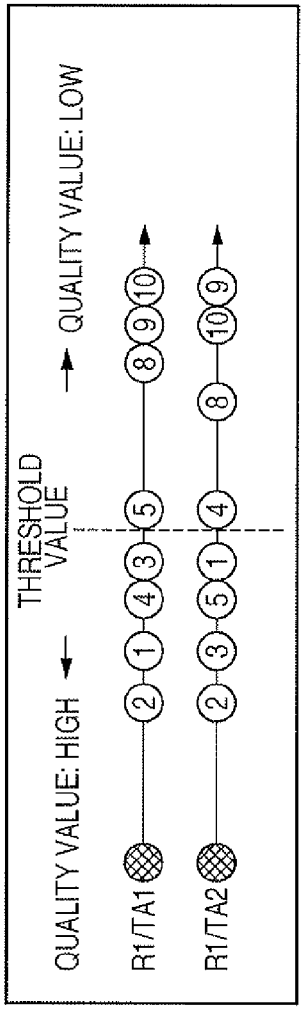

Upon receiving the reply signal in which the communication quality is zero, the root R1 determines that the nodes N6 and N7 does not work, and erases the information for the nodes N6 and N7 from the table shown in FIG. 8A that was created based on the information that is collected initially. The root R1 then executes the aforementioned processing again to create the tables shown in FIG. 13A.

Figure 13B:
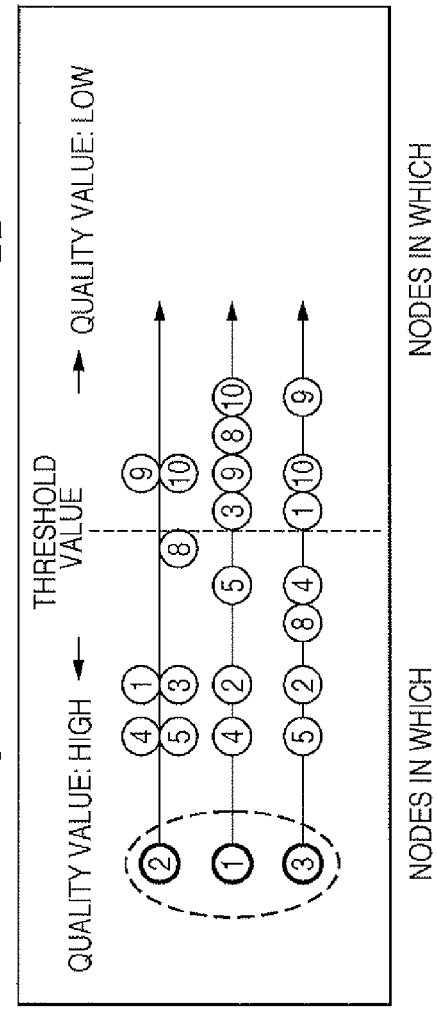

In this case, since there is no change in the communication quality of the nodes N2, N1, and N3 that are selected as relay terminals, the table shown in FIG. 13B can be further created. The root R1 also deletes the nodes N6 and N7 from the table shown in FIG. 13B.

In this case, according to FIG. 13B, the nodes in which two paths having the communication quality being greater than or equal to the threshold value can be taken are the nodes N4, N5, and N8.

Thus, when these nodes N4, N5, and N8 are selected as tertiary relay terminals, a communication quality table shown in FIG. 13C can be further created from the information that is first collected in FIG. 8C. The nodes N6 and N7 are also deleted for FIG. 13C.

According to FIG. 13C, the root R1 can determine that there are no node in which two paths having the communication quality being greater than or equal to the threshold value can not be taken. Accordingly, the root R1 allocates node N2 to slot 2, allocates node N1 to slot 3, allocates node N3 to slot 4, allocates node N4 to slot 5, allocates node N5 to slot 6, and allocates node N8 to slot 7.

The root R1 notifies the allocated time slot arrangement to all of the nodes using the slot notification command 620. Each node that receives the slot notification command 620 continues communication using the newly allocated time slots.

According to the above configuration, even when some nodes are unable to communicate, the remaining nodes can secure two or more wireless communication paths. Therefore, even if one communication path is obstructed by some kind of obstacle, a frame with the same contents can be received within the time period Ts using the remaining communication path. Further, since the more favorable path is used first for relaying, deterioration in the quality of data that is transmitted by relay is reduced. Consequently, all nodes can receive data with few errors.

Fourth Embodiment

According to the above described first to third embodiments, the sound source data of surround music was described as stream data of a plurality of channels. However, the data may be video data of multiple channels or, naturally, may be data communication between computers.

Further, the communication technique is not limited to the above described OFDM technique, and may be a CDMA technique or a frequency hopping technique or, naturally, may be another wireless technique. Further, the modulation technique may also be an ASK technique, an FSK technique, a QPSK technique, an 8 PSK technique, a 16 QAM technique, or another modulation technique.

According to the above described embodiments, when allocating time slots, paths that offer good communication quality are first designated as the paths between communication terminals that perform relay transmission. It is therefore possible to avoid transmitting data of poor quality in which an error has occurred by consecutive relay transmission.

Further, even in a case in which the condition of a communication path changes because an obstacle appears or a relay terminal moves or the like, it is possible to avoid transmitting data of poor quality in which an error has occurred by consecutive relay transmission.

Other Embodiments

The embodiments of the present invention have been described in detail. Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser on a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-216404, filed Aug. 22, 2007, which is hereby incorporated by reference herein in its entirety.

The invention claimed is:

1. A relayed communication system having a supervising station and a plurality of communication stations and for transmitting data from the supervising station by relay transmission, the system comprising:
   a determination unit configured to determine a communication quality, based on an error rate of received data, between each of the plurality of communication stations and the supervising station; and
   a notification unit configured to notify means for notifying the communication quality determined by the determination unit to the supervising station,
   wherein the supervising station comprising:
   an allocation unit configured to, in a case that the communication quality notified by the notification unit is equal to or greater than a predetermined value, allocate one or more communication stations as a relay station to respective time slots in accordance with the communication quality; and
   a transmission unit configured to transmit a result of allocation by the allocation unit to the plurality of communication stations.

2. The system according to claim 1, wherein the determination unit further detects a communication quality between communication stations of the plurality of communication stations, and
   the allocation unit allocates one or more of the plurality of communication stations to act as a relay station to respective time slots in accordance with a number of time slots and a plurality of the communication qualities notified by the notification unit, so that all the communication stations are connected with the communication quality being equal to or greater than the predetermined value.

3. The system according to claim 2, wherein the allocation unit, in addition to the relay station, selects one or more communication stations to act as a tertiary relay station and allocates a time slot of the tertiary relay station to a time slot after a time slot allocated to the relay station, so as to connect with the communication quality being equal to or greater than the predetermined value.

4. The system according to claim 1, wherein the transmission unit transmits by broadcasting to the plurality of communication stations.

5. The system according to claim 1, wherein the communication quality being equal to or greater than the predetermined value corresponds to a communication quality in which the supervising station and the communication station, or the communication stations can communicate via a plurality of communication paths.

6. The system according to claim 1, wherein the supervising station executes processing by the allocation unit and the transmission unit again, in a case that a communication quality notified by the notification unit is no longer equal to or greater than the predetermined value.

7. A method of controlling a relayed communication system having a supervising station and a plurality of communication stations and for transmitting data from the supervising station by relay transmission, the method comprising the steps of:
   determining a communication quality, based on an error rate of received data, between each of the plurality of communication stations and the supervising station;
   notifying the communication quality determined in the determining step from the communication station to the supervising station;
   allocating one or more communication stations as a relay station to respective time slots in accordance with the communication quality, in a case that the notified communication quality is equal to or greater than a predetermined value; and
   transmitting a result of allocation in the allocating step to the plurality of communication stations from the supervising station.

8. The method according to claim 7, wherein, in the determining step, a communication quality between communication stations of the plurality of communication stations is determined; and
   in the allocating step, one or more of the plurality of communication stations are allocated to act as relay stations to respective time slots in accordance with a number of time slots and a plurality of communication stations notified in the notifying step, so that all the communication stations are connected with the communication quality being equal to or greater than the predetermined value.

9. The method according to claim 8, wherein in the allocating step, in addition to the relay station, one or more communication stations are selected to act as tertiary relay stations, and a time slot of the tertiary relay station is allocated to a time slot after a time slot allocated to the relay station, so as to connect with the communication quality being equal to or greater than the predetermined value.

10. The method according to claim 7, wherein, in the transmitting step, the supervising station broadcasts to the plurality of communication stations.

11. The method according to claim 7, wherein the communication quality being equal to or greater than the predetermined value corresponds to a communication quality in which the supervising station and the communication station, or the communication stations can communicate via a plurality of communication paths.

12. The method according to claim 7, wherein the supervising station executes processing of the allocating step and the transmitting step again, in a case that the communication quality notified in the notifying step is no longer equal to or greater than the predetermined value.

13. A communication apparatus, comprising:
   a receiver configured to receive a communication quality determined based on an error rate of data received from each of a plurality of communication stations;
   an allocation unit configured to allocate time slots in accordance with the received communication quality, wherein the communication quality indicates the communication quality between the communication apparatus and the communication stations or between the communication stations; and
   a transmission unit configured to transmit a result of allocation by the allocation unit to the plurality of communication stations.

14. A method of controlling a communication apparatus, comprising:
   receiving a communication quality determined based on an error rate of data received from each of a plurality of communication stations;
   allocating time slots in accordance with the received communication quality, wherein the communication quality indicates the communication quality between the communication apparatus and the communication stations or between the communication stations; and
   transmitting a result of allocation in the allocating step to the plurality of communication stations.

* * * * *